US 12,299,026 B2

United States Patent
Lai et al.

(10) Patent No.: US 12,299,026 B2
(45) Date of Patent: May 13, 2025

(54) LOW-RESOURCE EVENT UNDERSTANDING

(71) Applicant: ADOBE INC., San Jose, CA (US)

(72) Inventors: Dac Viet Lai, Eugene, OR (US);
Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 194 days.

(21) Appl. No.: 17/663,711

(22) Filed: May 17, 2022

(65) Prior Publication Data

US 2023/0376516 A1    Nov. 23, 2023

(51) Int. Cl.
| | |
|---|---|
| *G06F 16/35* | (2025.01) |
| *G06F 16/335* | (2019.01) |
| *G06F 16/338* | (2019.01) |
| *G06F 18/214* | (2023.01) |
| *G06N 5/02* | (2023.01) |

(52) U.S. Cl.
CPC ............ *G06F 16/35* (2019.01); *G06F 16/335* (2019.01); *G06F 16/338* (2019.01); *G06F 18/214* (2023.01); *G06N 5/02* (2013.01)

(58) Field of Classification Search
None
See application file for complete search history.

(56) References Cited

U.S. PATENT DOCUMENTS

| | | | |
|---|---|---|---|
| 2019/0026600 A1* | 1/2019 | Bagherinezhad | ............................ G06F 18/24133 |
| 2019/0192880 A1* | 6/2019 | Hibbard | ................. G16H 50/20 |
| 2020/0104643 A1* | 4/2020 | Hu | ......................... G06F 16/906 |
| 2021/0064989 A1* | 3/2021 | Shaker | ...................... G06N 3/08 |
| 2021/0406718 A1* | 12/2021 | Hall | ......................... G06N 5/04 |
| 2022/0138572 A1* | 5/2022 | Song | ..................... G06F 9/4881 706/20 |

OTHER PUBLICATIONS

1Deng, et al., "Meta-Learning with Dynamic-Memory-Based Prototypical Network for Few-Shot Event Detection", In Proceedings of the 13th International Conference on Web Search and Data Mining; arXiv preprint arXiv:1910.11621v2 [cs.CL] Nov. 13, 2019, 9 pages.
2Fei, et al., "MELR: Meta-Learning Via Modeling Episode-Level Relationships for Few-Shot Learning", In Proceedings of the International Conference on Learning Representations (ICLR), 2021, 20 pages.

(Continued)

*Primary Examiner* — Kannan Shanmugasundaram
(74) *Attorney, Agent, or Firm* — F. CHAU & ASSOCIATES, LLC

(57) ABSTRACT

Systems and methods for natural language processing are described. Embodiments of the present disclosure receive text including an event trigger word indicating an occurrence of an event; classify the event trigger word to obtain an event type using a few-shot classification network, wherein the few-shot classification network is trained by storing first labeled samples during a first training iteration and using the first labeled samples for computing a loss function during a second training iteration that includes a support set with second labeled samples having a same ground-truth label as the first labeled samples; and transmit event detection information including the event trigger word and the event type.

20 Claims, 9 Drawing Sheets

(56) References Cited

OTHER PUBLICATIONS

3Lai, et al., "Exploiting the Matching Information in the Support Set for Few Shot Event Classification", In Proceedings of the 24th Pacific-Asia Conference on Knowledge Discovery and Data Mining (PAKDD), 2020a, 12 pages.
4Lai, et al., "Extensively Matching for Few-shot Learning Event Detection", In Proceedings of the First Joint Workshop on Narrative Understanding, Storylines, and Events; arXiv preprint arXiv:2006.10093v1 [cs.CL] Jun. 17, 2020, 8 pages.
5Lai, et al., "Event Detection: Gate Diversity and Syntactic Importance Scores for Graph Convolution Neural Networks", In Proceedings of the 2020 Conference on Empirical Methods in Natural Language Processing (EMNLP), pp. 5405-5411, Online, Association for Computational Linguistics, 2020.
6Snell, et al., "Prototypical Networks for Few-shot Learning", In Proceedings of the Conference on Neural Information Processing Systems (NeurIPS), arXiv preprint arXiv:1703.05175v2 [cs.LG] Jun. 19, 2017, 13 pages.
7Xiong, et al., "Dynamic Memory Networks for Visual and Textual Question Answering", In Proceedings of the 33rd International Conference on Machine Learning (ICML), 2016, 10 pages.
8Yang, et al., "Exploring Pre-trained Language Models for Event Extraction and Generation", In Proceedings of the 57th Annual Meeting of the Association for Computational Linguistics, pp. 5284-5294, 2019.

\* cited by examiner

LOW-RESOURCE EVENT UNDERSTANDING

BACKGROUND

The following relates generally to natural language processing, and more specifically to event detection using machine learning. Natural language processing (NLP) refers to techniques for using computers to interpret natural language. In some cases, NLP tasks involve assigning annotation data such as grammatical information to words or phrases within a natural language expression. Different classes of machine learning algorithms have been applied to NLP tasks. Event detection is a sub-field of NLP that involves identifying events such as actions or moments referred to within text. In some examples, event detection models identify and classify event trigger words of pre-defined event types of text.

Conventional event detection systems are based on supervised learning methods that depend on a large amount of labeled data for each pre-defined event type. These systems are not scalable to handle situations where unseen event types emerge, or where training samples are insufficient. Therefore, there is a need in the art for an event detection system that can be efficiently trained and is scalable to handle unseen event types.

SUMMARY

The present disclosure describes systems and methods for event detection. Embodiments of the present disclosure include an event detection apparatus configured to classify an event trigger word in text to obtain an event type for the trigger word. A few-shot classification network of the event detection apparatus classifies the event trigger word. The few-shot classification network is trained by storing first labeled samples during a first training iteration and using the first labeled samples for computing a loss function during a second training iteration that includes a support set with second labeled samples having a same ground-truth label as the first labeled samples. That is, a training component trains the few-shot classification network using two sets of labeled samples for each training iteration. One of the sets is randomly selected and the other is chosen from a recently used set for the same task. This helps prevent "forgetting" during training. Accordingly, the event detection apparatus can be trained with fewer labeled samples and is scalable to unseen event types.

A method, apparatus, and non-transitory computer readable medium for training a machine learning model are described. One or more embodiments of the method, apparatus, and non-transitory computer readable medium include receiving a training set comprising a plurality of labeled samples, wherein each of the plurality of labeled samples is associated with a ground-truth label from a plurality of ground-truth labels; selecting a first support set of labeled samples for a first training task of a current training iteration; selecting a second support set of labeled samples for a second training task of the current training iteration, wherein the second support set is selected from a set of stored samples from at least one previous training iteration, and wherein the second support set comprises a same set of ground-truth labels as the first support set; classifying the labeled samples of the first support set and the second support set using a few-shot classification network to obtain predicted labels for the first support set and the second support set; computing a loss function for the current training iteration based on the first support set and the second support set by comparing the predicted labels and the ground-truth labels; and updating parameters of the few-shot classification network based on the loss function.

A method, apparatus, and non-transitory computer readable medium for event detection are described. One or more embodiments of the method, apparatus, and non-transitory computer readable medium include receiving text including an event trigger word indicating an occurrence of an event; classifying the event trigger word to obtain an event type using a few-shot classification network, wherein the few-shot classification network is trained by storing first labeled samples during a first training iteration and using the first labeled samples for computing a loss function during a second training iteration that includes a support set with second labeled samples having a same ground-truth label as the first labeled samples; and transmitting event detection information including the event trigger word and the event type.

An apparatus and method for event detection are described. One or more embodiments of the apparatus and method include a sample selection component configured to select a first support set of labeled samples from a training set for a first training task of a current training iteration, and to select a second support set of the labeled samples for a second training task of the current training iteration, wherein the second support set is selected from a set of stored samples from at least one previous training iteration, and wherein the second support set comprises a same set of ground-truth labels as the first support set; a few-shot classification network configured to classify the labeled samples of the first support set and the second support set to obtain predicted labels for the first support set and the second support set; and a training component configured to compute a loss function for the current training iteration based on the first support set and the second support set by comparing the predicted labels and the ground-truth labels from the training set, and to update parameters of the few-shot classification network based on the loss function.

DETAILED DESCRIPTION

Figure 1:
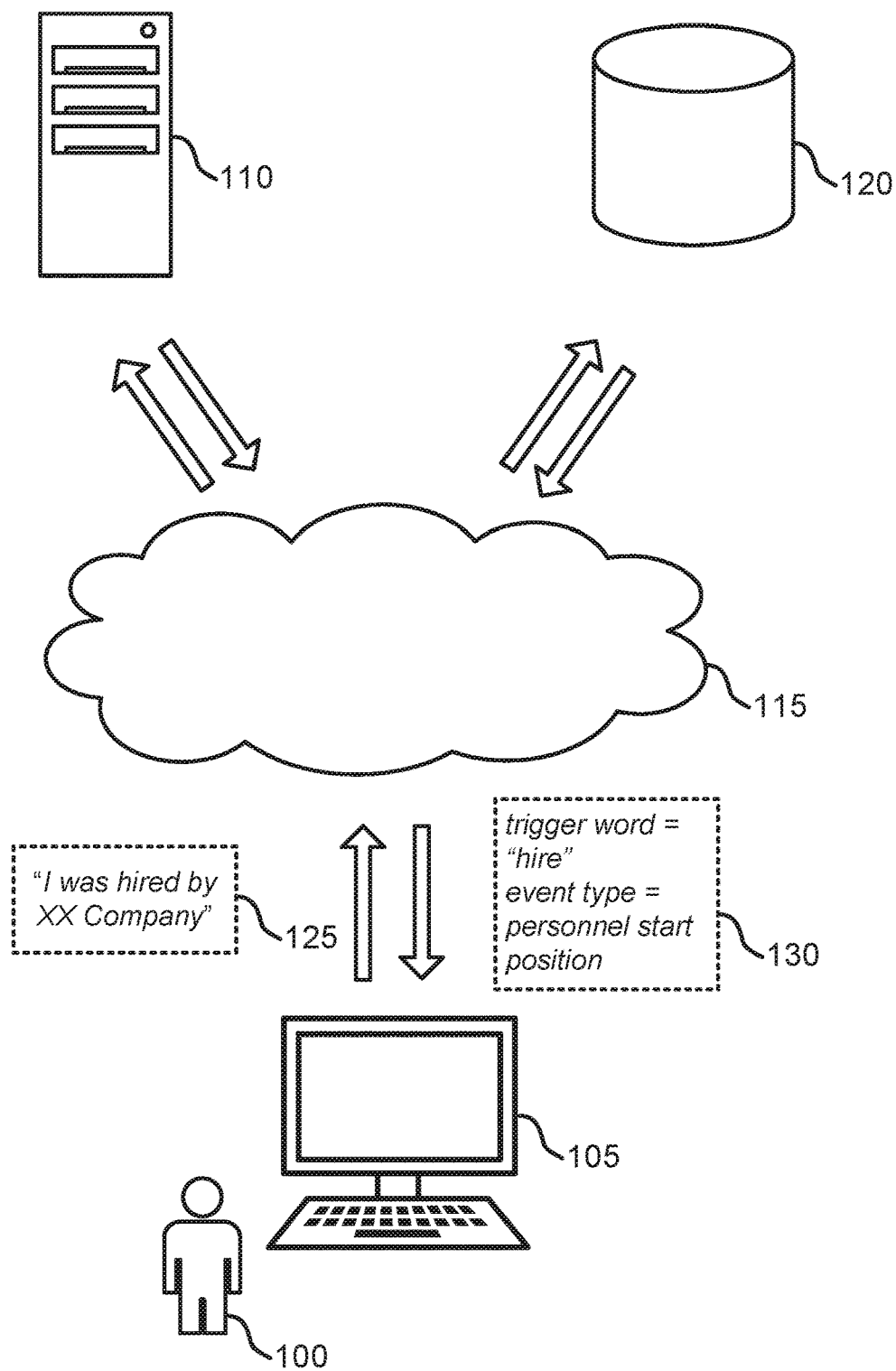
FIG. 1 shows an example of an event detection system according to aspects of the present disclosure.

The present disclosure describes systems and methods for event detection. Embodiments of the present disclosure include an event detection apparatus configured to classify an event trigger word in text to obtain an event type for the trigger word. A few-shot classification network of the event detection apparatus classifies the event trigger word. The few-shot classification network is trained by storing first labeled samples during a first training iteration and using the first labeled samples for computing a loss function during a second training iteration that includes a support set with second labeled samples having a same ground-truth label as the first labeled samples. That is, a training component trains the few-shot classification network using two sets of labeled samples for each training iteration. One of the sets is randomly selected and the other is chosen from a recently used set for the same task. This helps prevent "forgetting" during training. Accordingly, the event detection apparatus is trained with fewer labeled samples and is scalable to unseen event types.

Conventional event detection systems depend on a large amount of labeled data for each pre-defined event type. It is costly to use these systems at inference where unseen event types emerge and samples are not sufficient. Conventional systems are generally not able to extract trigger words of unseen event types (i.e., beyond event types provided in the training data) for which relatively few examples are provided.

In some examples, machine learning models apply few-shot learning (FSL) to event detection. N-way K-shot episodic training examines existing datasets to emulate learning from relatively few examples. A small subset (i.e., a support set) of N event types with K examples per type is sampled from the training data at each training iteration. However, the sample size is small ($K \in [1, 10]$) such that conventional systems often suffer from sample bias and they are not generalizable to unseen event types.

Embodiments of the present disclosure include an event detection apparatus configured to reduce the effects of poor sampling and outliers by modeling cross-task relation. The event detection apparatus is configured to augment the support data of a current task with those from prior tasks that help increase the population of the current support set. In some examples, a current training iteration (or episode) takes latest samples that have already appeared in a previous iteration. The event detection apparatus makes a connection between the current training iteration and the previous training iterations to augment quality of the training samples. In addition, the event detection apparatus has a memory to store training samples appeared in past iterations or episodes. Accordingly, sample bias in the support set is decreased.

According to at least one embodiment of the present disclosure, the event detection apparatus includes a prototypical network that is a metric-based few-shot learning model. The prototypical network has a prototype vector for a corresponding event type by averaging the representations of the instances of the corresponding event type. A non-parametric classifier predicts the event type of a query instance based on its distance from the prototype. In some examples, averaging in a prototypical network makes outliers contribute equally to the prototype representation. The event detection apparatus applies soft attention to select the most related data samples as well as to reduce the contribution of the outliers to the prototype representation.

A few shot learning model that is resistant to the outliers would produce consistent predictions regardless of support data. According to an embodiment, the event detection apparatus includes two prototypical-based classifiers from the two support sets of two training tasks. The training component enforces the consistency of their predictions on query instances. As a result, sampling bias and outliers in few-shot learning for event detection are decreased. The event detection apparatus models relations between training tasks in episodic few-shot learning using cross-task prototypes, that is, using two sets of labeled samples for each training iteration. One of the sets is randomly selected and the other is chosen from a recently used set for the same task. Accordingly, "forgetting" during training can be prevented.

Embodiments of the present disclosure may be used in the context of event detection or question answering applications. For example, an event detection network based on the present disclosure takes text including an event trigger word and efficiently identifies an event type corresponding to the event trigger word. An example application of the inventive concept in the question answering context is provided with reference to FIG. 4. Details regarding the architecture of an example event detection apparatus are provided with reference to FIGS. 1-3. An example process for event detection is provided with reference to FIG. 5. Example training processes are described with reference to FIGS. 6-9.

Network Architecture

Figure 2:
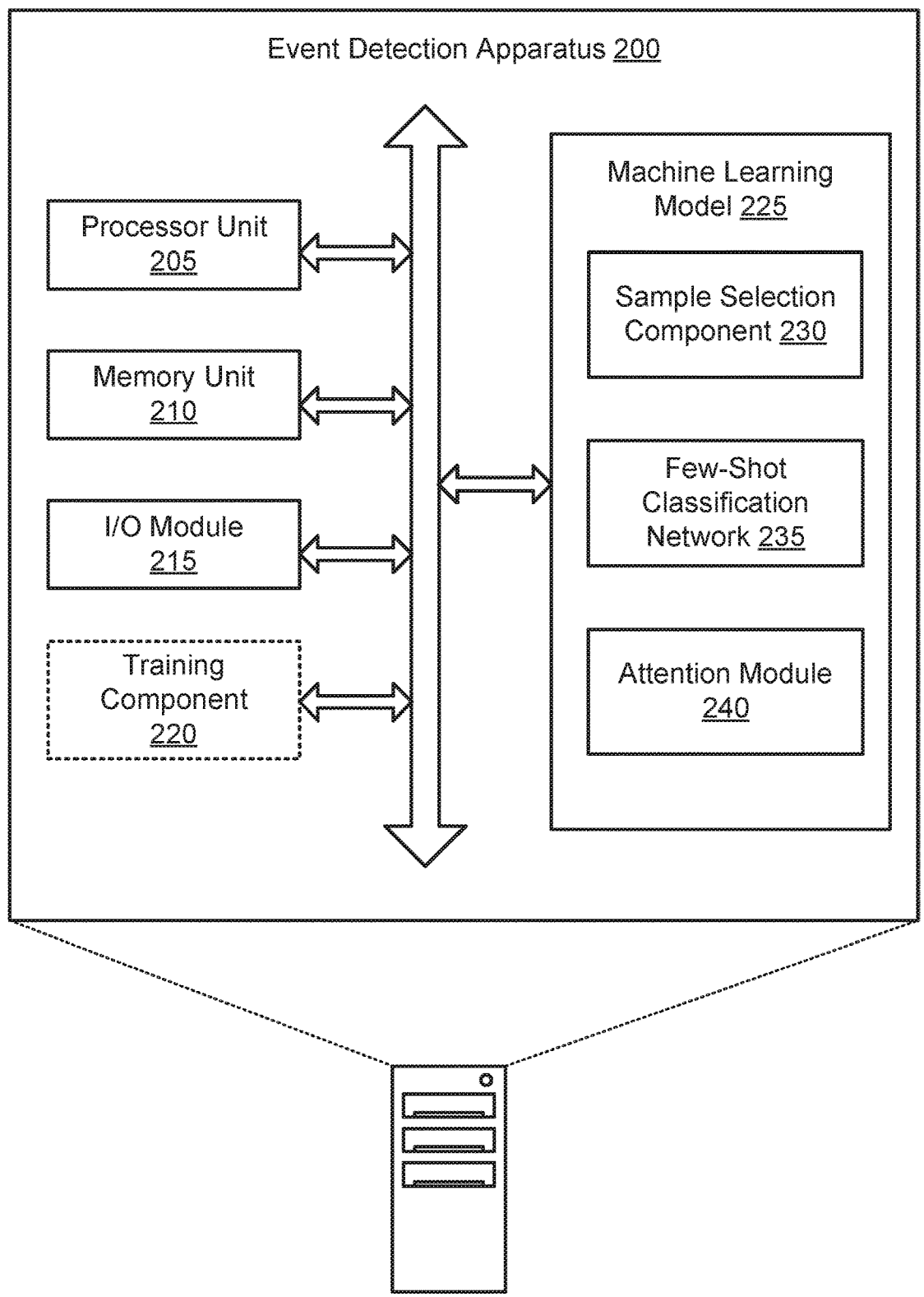
FIG. 2 shows an example of an event detection apparatus according to aspects of the present disclosure.
Figure 3:
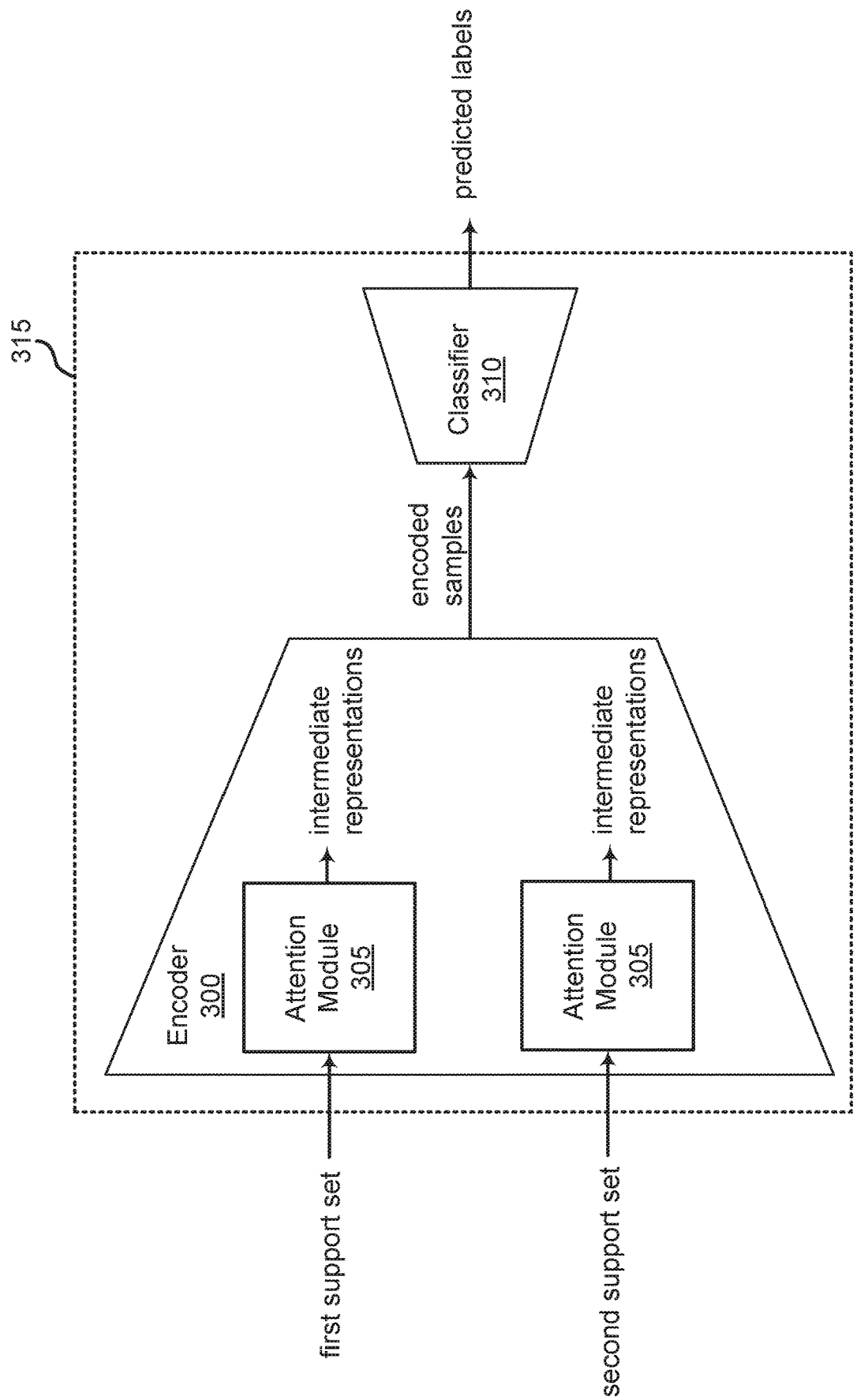
FIG. 3 shows an example of a few-shot classification network according to aspects of the present disclosure.

In FIGS. 1-3, an apparatus and method for event detection are described. One or more embodiments of the apparatus and method include a sample selection component configured to select a first support set of labeled samples from a training set for a first training task of a current training iteration, and to select a second support set of the labeled samples for a second training task of the current training iteration, wherein the second support set is selected from a set of stored samples from at least one previous training iteration, and wherein the second support set comprises a same set of ground-truth labels as the first support set; a few-shot classification network configured to classify the labeled samples of the first support set and the second support set to obtain predicted labels for the first support set and the second support set; and a training component configured to compute a loss function for the current training iteration based on the first support set and the second support set by comparing the predicted labels and the ground-truth labels from the training set, and to update parameters of the few-shot classification network based on the loss function.

Some examples of the apparatus and method further include an encoder of the few-shot classification network configured to encode the labeled samples of the first support set and the second support set to obtain encoded samples of the first support set and the second support set, wherein the predicted labels of the first support set and the second support set are obtained based on the encoded samples of the first support set and the second support set.

Some examples of the apparatus and method further include a classifier of the few-shot classification network configured to classify the labeled samples of the first support set and the second support set based on the encoded samples of the first support set and the second support set.

Some examples of the apparatus and method further include an attention module configured to perform an attention procedure on the labeled samples of the first support set based on the labeled samples of the second support set to obtain intermediate representations of the first support set, and to perform the attention procedure on the labeled samples of the second support set based on the labeled samples of the first support set to obtain intermediate representations of the second support set, wherein the loss function is computed based on the intermediate representations of the first support set and the second support set.

In some embodiments, the sample selection component is configured to store the labeled samples from a previous support set from the at least one previous training iteration, and to determine that at least one of the labeled samples from the previous support set has a same ground-truth label as at least one of the labeled samples from the first support set, wherein the second support set is selected to include the at least one of the labeled samples from the previous support set based on the determination.

FIG. 1 shows an example of an event detection system according to aspects of the present disclosure. The example shown includes user 100, user device 105, event detection apparatus 110, cloud 115, database 120, input text 125, and labeled text 130. Event detection apparatus 110 is an example of, or includes aspects of, the corresponding element described with reference to FIG. 2.

As an example illustrated in FIG. 1, user 100 uploads text "I was hired by XX Company" to event detection apparatus 110, e.g., via user device 105 and cloud 115. User 100 is interested in knowing the trigger word and the corresponding event type. The text includes an event trigger word indicating an occurrence of an event. Event detection apparatus 110 identifies and classifies the event trigger word to obtain an event type using a few-shot classification network.

In some embodiments, the few-shot classification network is trained by storing first labeled samples during a first training iteration and using the first labeled samples for computing a loss function during a second training iteration that includes a support set with second labeled samples having a same ground-truth label as the first labeled samples.

Event detection apparatus 110 then transmits the event detection information including the event trigger word and the event type. Event trigger words are phrases that clearly indicate the occurrence of events. In the above example, the trigger word is "hire" or "hired". Event type of the trigger word is personnel start position. In another example, "The user changes the border color of the rectangle to blue", event detection apparatus 110 identifies that the sentence contains a "changes" event. The trigger word and event type are returned to user 100, via cloud 115 and user device 105. The process of using event detection apparatus 110 is further described with reference to FIG. 4.

User device 105 may be a personal computer, laptop computer, mainframe computer, palmtop computer, personal assistant, mobile device, or any other suitable processing apparatus. In some examples, user device 105 includes software that incorporates an information extraction application (e.g., a question answering application). In some examples, the information extraction application on user device 105 may include functions of event detection apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Event detection apparatus 110 includes a computer implemented network comprising a sample selection component, a few-shot classification network, and an attention module. In some examples, event detection apparatus 110 further includes an encoder and a classifier.

Event detection apparatus 110 may also include a processor unit, a memory unit, an I/O module, and a training component. The training component is used to train a machine learning model (or event detection network). Additionally, event detection apparatus 110 can communicate with database 120 via cloud 115. In some cases, the architecture of the event detection network is also referred to as a network or a network model. Further detail regarding the architecture of event detection apparatus 110 is provided with reference to FIGS. 1-3. Further detail regarding the operation of event detection apparatus 110 is provided with reference to FIGS. 4-5.

In some cases, event detection apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an event detection apparatus 200 according to aspects of the present disclosure. The example shown includes event detection apparatus 200, processor unit 205, memory unit 210, I/O module 215, training component 220, and machine learning model 225. Event detection apparatus 200 is an example of, or includes aspects of, the corresponding element described with reference to FIG. 1. Machine learning model 225 is an example of, or includes aspects of, the corresponding element described with reference to FIG. 7. In one embodiment, machine learning model 225 includes sample selection component 230, few-shot classification network 235, and attention module 240.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, event detection apparatus 200 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Few-shot learning is a type of machine learning method where the training dataset contains limited information. Few-shot learning is characterized as meta-learning task, where the model is understood as "learning to learn." Unlike traditional machine learning, few-shot learning classifies new data with small training data (between zero and five examples). Applications of few-shot learning involve computer vision, natural language processing (NLP), audio processing, robotics, healthcare, and mathematical applications.

Zero-shot learning is a variation of few-shot learning. Zero-shot learning aims to classify an unseen class without exposure to any instances belonging to that class in the training dataset. For example, a model may consider general traits of an object such as appearance, properties, and functionalities to classify the object without depending on any training data. K-shot learning, a variation of few-shot learning, uses K number of examples as training dataset to classify an object in an image. In a N-way K-shot learning, another variation of few-shot learning, there is a training set (i.e., support set) consisting of N class labels and K labeled images for each class (i.e., K examples) and a query set consisting of query images. Unlike supervised learning, in which the data is split into training, validation, and test sets, few-shot learning splits the dataset into training sets and test sets.

According to some embodiments, machine learning model 225 receives text including an event trigger word indicating an occurrence of an event. In some examples, machine learning model 225 transmits event detection information including the event trigger word and the event type. In some examples, machine learning model 225 generates a response to the query based on the event detection information.

According to some embodiments, training component 220 receives a training set including a set of labeled samples, where each of the set of labeled samples is associated with a ground-truth label from a set of ground-truth labels. In some examples, training component 220 computes a loss function for the current training iteration based on the first support set and the second support set by comparing the predicted labels and the ground-truth labels. Training component 220 updates parameters of few-shot classification network 235 based on the loss function.

In some examples, training component 220 averages the intermediate representations of the first support set to obtain a first prototype of the first support set. Training component 220 averages the intermediate representations of the second support set to obtain a second prototype of the second support set, where the loss function is computed based on the first prototype and the second prototype. In some examples, training component 220 computes a first cross-entropy loss based on the predicted labels of the first support set. Training component 220 computes a second cross-entropy loss based on the predicted labels of the second support set, where the loss function is computed based on the first cross-entropy loss and second cross-entropy loss.

In some examples, training component 220 trains a first prototypical classifier based on the first support set. Training component 220 trains a second prototypical classifier based on the second support set. Training component 220 computes a first divergence based on the first predicted labels of the first support set and the second predicted labels of the first support set. Training component 220 computes a second divergence based on the first predicted labels of the second support set and the second predicted labels of the second support set, where the loss function is based on the first divergence and the second divergence. In some examples, training component 220 identifies a number of initial training iterations. Training component 220 determines that an index of the current training iteration is greater than the number of initial training iterations, where the second training task is selected based on the determination that the index of the current training iteration is greater than the number of initial training iterations.

In some examples, training component 220 determines that an index of the at least one previous training iteration is less than the number of initial training iterations. Training component 220 computes the loss function for the at least one previous training iteration using a single training task based on the determination that the index of the at least one previous training iteration is less than the number of initial training iterations.

According to some embodiments, training component 220 is configured to compute a loss function for the current training iteration based on the first support set and the second support set by comparing the predicted labels and the ground-truth labels from the training set, and to update parameters of few-shot classification network 235 based on the loss function. In some examples, training component 220 is part of another apparatus that is not event detection apparatus 200.

According to some embodiments, sample selection component 230 selects a first support set of labeled samples for a first training task of a current training iteration. In some examples, sample selection component 230 selects a second support set of labeled samples for a second training task of the current training iteration, where the second support set is selected from a set of stored samples from at least one previous training iteration, and where the second support set includes a same set of ground-truth labels as the first support set.

In some examples, sample selection component 230 selects a first query set of unlabeled samples for the first training task. Sample selection component 230 selects a second query set of unlabeled samples for the second training task, where the loss function is computed based on the first query set and the second query set. In some examples, sample selection component 230 stores labeled samples from a previous support set from the at least one previous training iteration. Sample selection component 230 determines that at least one of the labeled samples from the previous support set has a same ground-truth label as at least one of the labeled samples from the first support set, where the second support set is selected to include the at least one of the labeled samples from the previous support set based on the determination. In some examples, sample selection component 230 replaces the at least one of the labeled samples from the previous support set with the at least one of the labeled samples from the first support set in a memory based on the determination.

According to some embodiments, sample selection component 230 is configured to select a first support set of labeled samples from a training set for a first training task of a current training iteration, and to select a second support set of the labeled samples for a second training task of the current training iteration, wherein the second support set is selected from a set of stored samples from at least one previous training iteration, and wherein the second support set comprises a same set of ground-truth labels as the first support set.

In some embodiments, sample selection component 230 is configured to store the labeled samples from a previous support set from the at least one previous training iteration, and to determine that at least one of the labeled samples from the previous support set has a same ground-truth label as at least one of the labeled samples from the first support set, where the second support set is selected to include the at least one of the labeled samples from the previous support set based on the determination.

According to some embodiments, few-shot classification network 235 classifies the labeled samples of the first support set and the second support set using a few-shot classification network 235 to obtain predicted labels for the first support set and the second support set. In some examples, few-shot classification network 235 classifies the labeled samples of the first support set and the second support set using the first prototypical classifier to obtain first predicted labels for the first support set and the second support set. Few-shot classification network 235 classifies the labeled samples of the first support set and the second support set using the second prototypical classifier to obtain second predicted labels for the first support set and the second support set.

According to some embodiments, few-shot classification network 235 classifies the event trigger word to obtain an event type, where few-shot classification network 235 is trained by storing first labeled samples during a first training iteration and using the first labeled samples for computing a loss function during a second training iteration that includes a support set with second labeled samples having a same ground-truth label as the first labeled samples. In some examples, few-shot classification network 235 receives a document including the text. Few-shot classification network 235 generates the event detection information by classifying each event trigger word in the document.

According to some embodiments, few-shot classification network 235 is configured to classify the labeled samples of the first support set and the second support set to obtain predicted labels for the first support set and the second support set.

According to some embodiments, attention module 240 performs an attention procedure on the labeled samples of the first support set based on the labeled samples of the second support set to obtain intermediate representations of the first support set. In some examples, attention module 240 performs the attention procedure on the labeled samples of the second support set based on the labeled samples of the first support set to obtain intermediate representations of the second support set, where the loss function is computed based on the intermediate representations of the first support set and the second support set.

In some examples, attention module 240 performs the attention procedure on unlabeled samples of a first query set of the first training task based on the labeled samples of the second support set to obtain intermediate representations of the first query set. Attention module 240 performs the attention procedure on unlabeled samples of a second query set of the second training task based on the labeled samples of the first support set to obtain intermediate representations of the second query set, where the loss function is computed based on the intermediate representations of the first query set and the second query set. Attention module 240 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a few-shot classification network according to aspects of the present disclosure. The example shown includes encoder 300, attention module 305, classifier 310, and few-shot classification network 315. Few-shot classification network 315 is an example of, or includes aspects of, the corresponding element described with reference to FIG. 2. In some examples, attention module 305 may not be used at inference. Attention module 305 is an example of, or includes aspects of, the corresponding element described with reference to FIG. 2.

According to some embodiments, encoder 300 encodes the labeled samples of the first support set and the second support set to obtain encoded samples of the first support set and the second support set, where the predicted labels of the first support set and the second support set are obtained based on the encoded samples of the first support set and the second support set.

According to some embodiments, encoder 300 of few-shot classification network 315 is configured to encode the labeled samples of the first support set and the second support set to obtain encoded samples of the first support set and the second support set, wherein the predicted labels of the first support set and the second support set are obtained based on the encoded samples of the first support set and the second support set.

Figure 6:
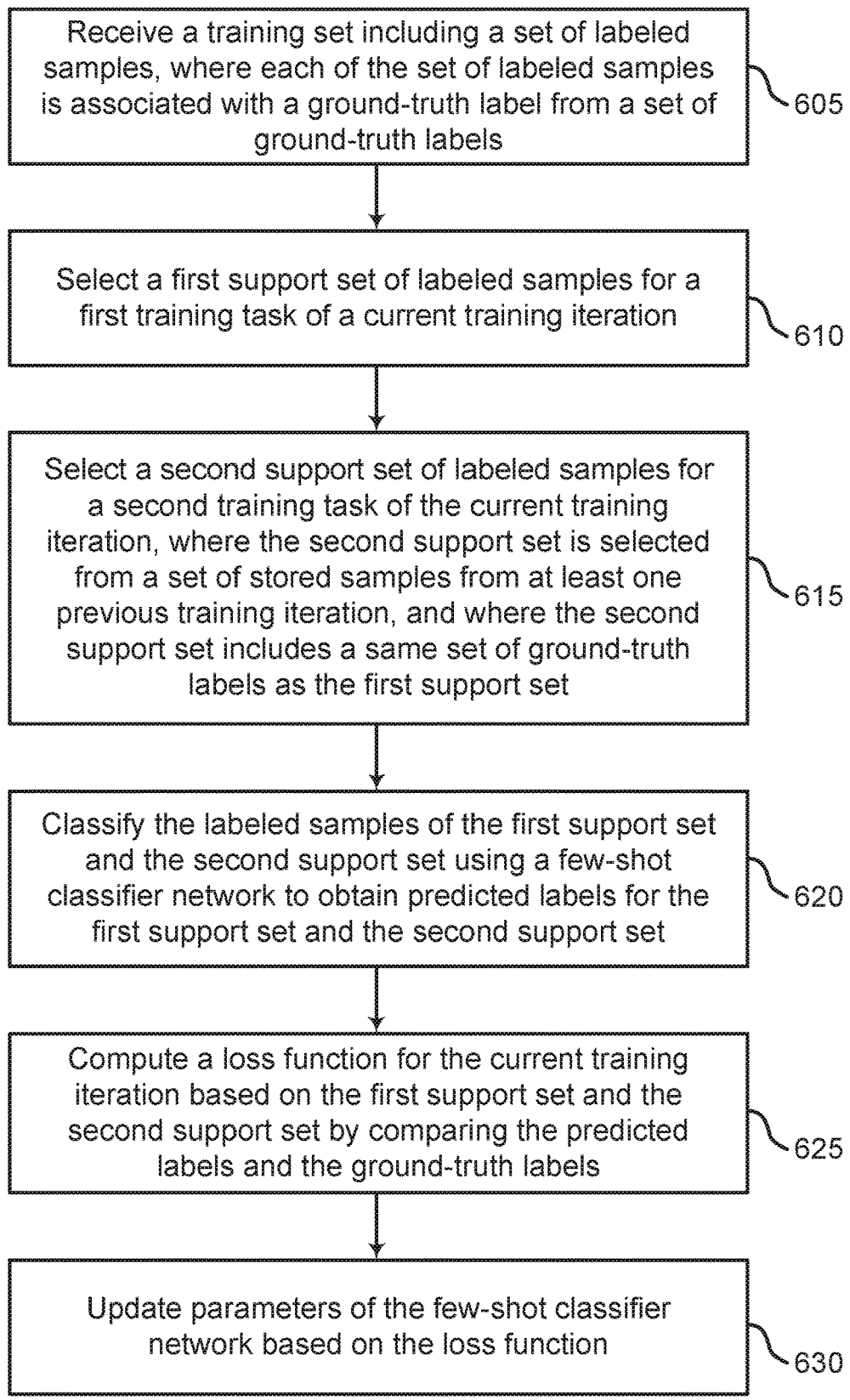
FIG. 6 shows an example of a method for training a machine learning model according to aspects of the present disclosure.

Referring to FIG. 6, a data point $(s_i^j, a_i^j, y^j)$ denotes a sentence $s_i^j$ with trigger candidate $a_i^j$ and event type $y^j$. In some examples, a few-shot learning model includes encoder 300 and few-shot classification network 315. Encoder 300, also denoted as $\phi$, encodes an instance into a fixed-dimension vector $v_i^j = \phi(s_i^j, a_i^j) \in R^u$ where u is the dimension of the representation vector. Few-shot classification network 315 classifies a query instance among classes appearing in the support set. For example, in a prototypical network, a prototype $v^j$ is a class-representative instance that is an average of all vectors of the j-th class $$v^j = \frac{1}{K}\Sigma_{i=1}^{K}\phi(s_i^j, a_i^j).$$

In some examples, few-shot classification network 315 includes classifier 310. Classifier 310 of few-shot classification network 315 is configured to classify the labeled samples of the first support set and the second support set based on the encoded samples of the first support set and the second support set.

Next, the distance distribution of the query instance $q = \{s_q, a_q, y_q\}$ is:

$$P(q = y^j; S) = \frac{e^{-d(v_q, v^j)}}{\Sigma_{k=1}^{N} e^{-d(v_q, v^k)}} \quad (1)$$

Training component 220 minimizes the cross-entropy loss, denoted by $L_{ce}$, over all query instances:

$$L_1(S, Q) = \sum_{q \in Q} L_{ce}(y_q, P(q; S)) \quad (2)$$

Event Detection

Figure 4:
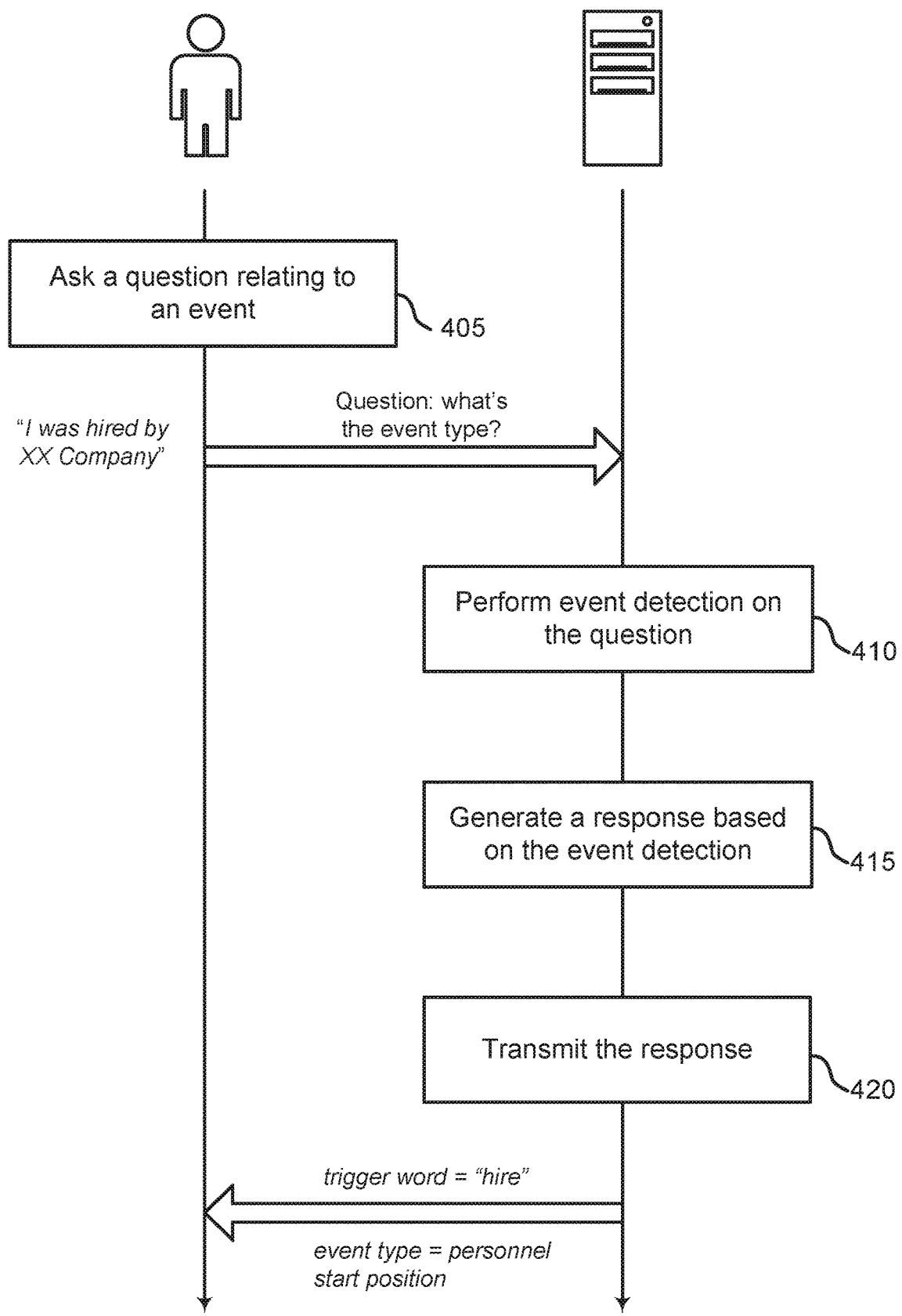
FIG. 4 shows an example of question answering according to aspects of the present disclosure.
Figure 5:
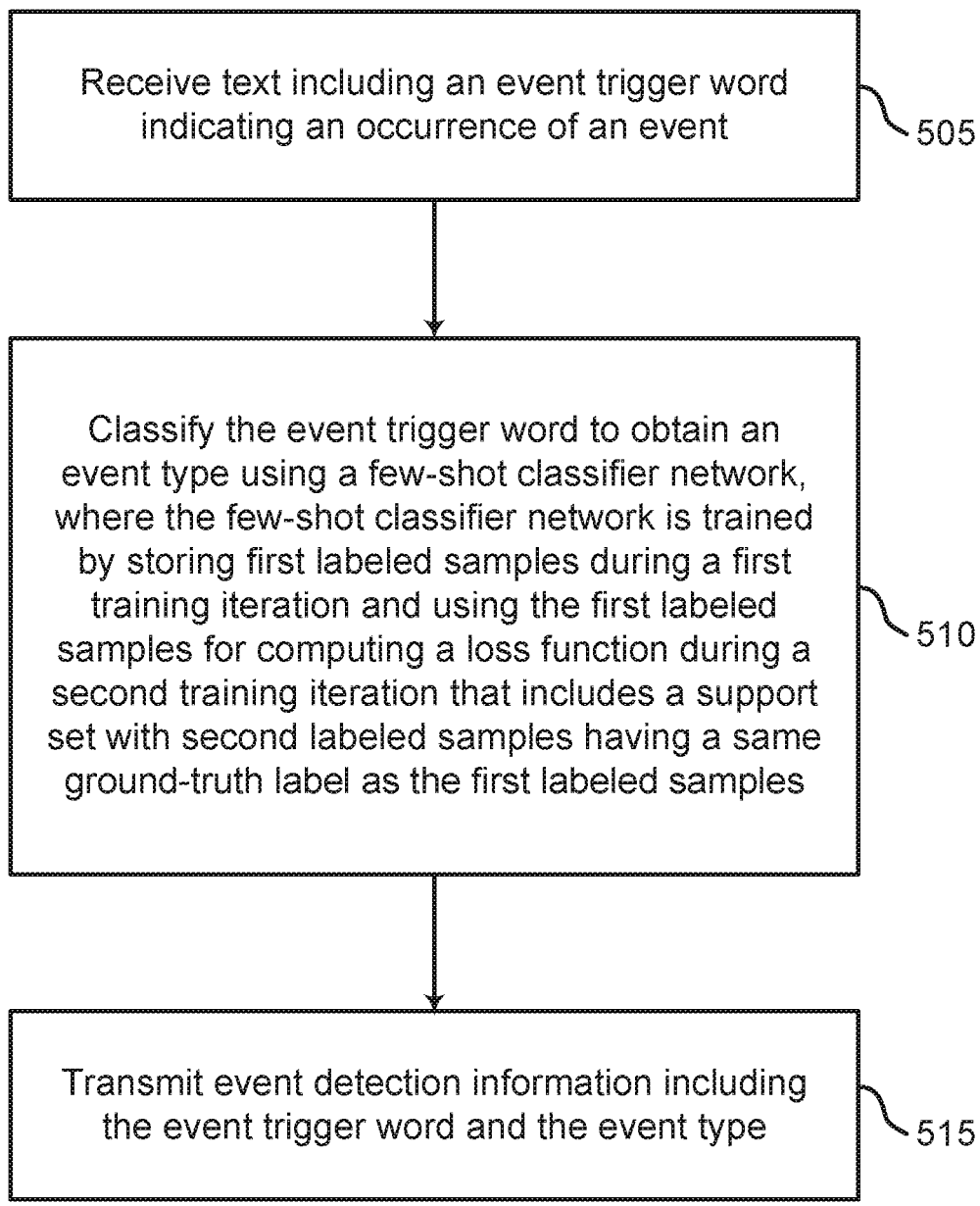
FIG. 5 shows an example of event detection according to aspects of the present disclosure.

In FIGS. 4-5, a method, apparatus, and non-transitory computer readable medium for event detection are described. One or more aspects of the method, apparatus, and non-transitory computer readable medium include receiving text including an event trigger word indicating an occurrence of an event; classifying the event trigger word to obtain an event type using a few-shot classification network, wherein the few-shot classification network is trained by storing first labeled samples during a first training iteration and using the first labeled samples for computing a loss function during a second training iteration that includes a support set with second labeled samples having a same ground-truth label as the first labeled samples; and transmitting event detection information including the event trigger word and the event type.

Some examples of the method, apparatus, and non-transitory computer readable medium further include receiving a document including the text. Some examples further include generating the event detection information by classifying each event trigger word in the document.

Some examples of the method, apparatus, and non-transitory computer readable medium further include receiving a query from a user. Some examples further include generating a response to the query based on the event detection information. Some examples further include providing the response to the user.

FIG. 4 shows an example of question answering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user asks a question relating to an event. In some cases, the operations of this step refer to, or may be performed by, a user as described with reference to FIG. 1. Event detection is a sub-task of information extraction that identifies and classifies event triggers of pre-defined event types in text. Event triggers are words or phrases that most clearly indicate the occurrence of events. In some examples, the user asks a question "what's the event type" in text "I was hired by XX Company". The phrase "hire" or "hired" is a trigger word indicating an occurrence of an event.

In another example, an event detection system receives text stating ". . . the medical examiner believed the manner of death was an accident rather than a homicide" and recognizes the word "homicide" in the sentence as a trigger word of event type, life.die.death-caused-by-violent-events.

At operation 410, the system performs event detection on the question. In some cases, the operations of this step refer to, or may be performed by, an event detection apparatus as described with reference to FIGS. 1 and 2. An event detection apparatus identifies and classifies event trigger word for an event type. In the example shown in FIG. 4, the identified trigger word is "hire" or "hired". The event detection apparatus classifies the trigger word as event type "personnel start position".

At operation 415, the system generates a response based on the event detection. In some cases, the operations of this step refer to, or may be performed by, an event detection apparatus as described with reference to FIGS. 1 and 2.

At operation 420, the system transmits the response to the user. In some cases, the operations of this step refer to, or may be performed by, an event detection apparatus as described with reference to FIGS. 1 and 2. The system returns the response/answer to the user. The user then knows the trigger word of the text and the corresponding event type.

FIG. 5 shows an example of event detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives text including an event trigger word indicating an occurrence of an event. In some cases, the operations of this step refer to, or may be performed by, a machine learning model as described with reference to FIGS. 2 and 7. For example, text is "I was hired by Company XX". The machine learning model identifies a trigger word "hire" from the text.

At operation 510, the system classifies the event trigger word to obtain an event type using a few-shot classification network, where the few-shot classification network is trained by storing first labeled samples during a first training iteration and using the first labeled samples for computing a loss function during a second training iteration that includes a support set with second labeled samples having a same ground-truth label as the first labeled samples. In some cases, the operations of this step refer to, or may be performed by, a few-shot classification network as described with reference to FIG. 2. In the above example, the few-shot classification network classifies the event type to be personnel start position. In some examples, a NULL class is used to represent non-event mentions in event detection. The NULL event type broadly covers domains and surface form except relevant event types. In some cases, an outlier in a support set may change the prototypes and flip the label of the query instance. At training, the few-shot classification network is trained to handle prediction consistency among classifiers across tasks such that the network model is robust to outliers at inference.

At training, training component 220 as shown in FIG. 2 identifies and exploits relationship between training tasks for few-shot learning in event detection. Machine learning model 225 computes prototypes based on cross-task modeling. In some cases, a regularization is applied to enforce prediction consistency of classifiers across tasks. Some example experiments indicate that exploiting cross-task relation reduces poor sampling and outliers in the support set for few-shot learning in event detection.

At operation 515, the system transmits event detection information including the event trigger word and the event type. In some cases, the operations of this step refer to, or may be performed by, a machine learning model as described with reference to FIGS. 2 and 7.

Training and Evaluation

In FIGS. 6-9, a method, apparatus, and non-transitory computer readable medium for training a machine learning model are described. One or more aspects of the method, apparatus, and non-transitory computer readable medium include receiving a training set comprising a plurality of labeled samples, wherein each of the plurality of labeled samples is associated with a ground-truth label from a plurality of ground-truth labels; selecting a first support set of labeled samples for a first training task of a current training iteration; selecting a second support set of labeled samples for a second training task of the current training iteration, wherein the second support set is selected from a set of stored samples from at least one previous training iteration, and wherein the second support set comprises a same set of ground-truth labels as the first support set; classifying the labeled samples of the first support set and the second support set using a few-shot classification network to obtain predicted labels for the first support set and the second support set; computing a loss function for the current training iteration based on the first support set and the second support set by comparing the predicted labels and the ground-truth labels; and updating parameters of the few-shot classification network based on the loss function.

Some examples of the method, apparatus, and non-transitory computer readable medium further include selecting a first query set of unlabeled samples for the first training task. Some examples further include selecting a second query set of unlabeled samples for the second training task, wherein the loss function is computed based on the first query set and the second query set.

Some examples of the method, apparatus, and non-transitory computer readable medium further include storing labeled samples from a previous support set from the at least one previous training iteration. Some examples further include determining that at least one of the labeled samples from the previous support set has a same ground-truth label as at least one of the labeled samples from the first support set, wherein the second support set is selected to include the at least one of the labeled samples from the previous support set based on the determination.

Some examples of the method, apparatus, and non-transitory computer readable medium further include replacing the at least one of the labeled samples from the previous support set with the at least one of the labeled samples from the first support set in a memory based on the determination.

Some examples of the method, apparatus, and non-transitory computer readable medium further include encoding the labeled samples of the first support set and the second support set using an encoder of the few-shot classification network to obtain encoded samples of the first support set and the second support set, wherein the predicted labels of the first support set and the second support set are obtained based on the encoded samples of the first support set and the second support set.

Some examples of the method, apparatus, and non-transitory computer readable medium further include performing an attention procedure on the labeled samples of the first support set based on the labeled samples of the second support set to obtain intermediate representations of the first support set. Some examples further include performing the attention procedure on the labeled samples of the second support set based on the labeled samples of the first support set to obtain intermediate representations of the second support set, wherein the loss function is computed based on the intermediate representations of the first support set and the second support set.

Some examples of the method, apparatus, and non-transitory computer readable medium further include performing the attention procedure on unlabeled samples of a first query set of the first training task based on the labeled samples of the second support set to obtain intermediate representations of the first query set. Some examples further include performing the attention procedure on unlabeled samples of a second query set of the second training task based on the labeled samples of the first support set to obtain intermediate representations of the second query set, wherein the loss function is computed based on the intermediate representations of the first query set and the second query set.

Some examples of the method, apparatus, and non-transitory computer readable medium further include averaging the intermediate representations of the first support set to obtain a first prototype of the first support set. Some examples further include averaging the intermediate representations of the second support set to obtain a second prototype of the second support set, wherein the loss function is computed based on the first prototype and the second prototype.

Some examples of the method, apparatus, and non-transitory computer readable medium further include identifying a number of initial training iterations. Some examples further include determining that an index of the current training iteration is greater than the number of initial training iterations, wherein the second training task is selected based on the determination that the index of the current training iteration is greater than the number of initial training iterations.

Some examples of the method, apparatus, and non-transitory computer readable medium further include determining that an index of the at least one previous training iteration is less than the number of initial training iterations. Some examples further include computing the loss function for the at least one previous training iteration using a single training task based on the determination that the index of the at least one previous training iteration is less than the number of initial training iterations.

FIG. 6 shows an example of a method for training a machine learning model according to aspects of the present disclosure. Training component 220 as shown in FIG. 2 is used to train machine learning model 225. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives a training set including a set of labeled samples, where each of the set of labeled samples is associated with a ground-truth label from a set of ground-truth labels. In some cases, the operations of this step refer to, or may be performed by, a training component as described with reference to FIG. 2.

The event detection task is formulated as N+1-way K-shot episodic few-shot learning. The machine learning model is given two sets of data: a support set $\mathcal{S}$ of labeled data, and a query set Q of unlabeled data. $\mathcal{S}$ consists of (N+1)×K data points in which N is the number of positive event types and K is the number of samples per event type. The model is supposed to predict the labels of the data in the query set based on the observation of the unseen event types given in the support set. Formally, a FSL task with a support set and a query set is defined as follows:

$$\mathcal{S}=\{((s_i^j, a_i^j, y^j) | i \in [1,K], j \in [0;N]\} \quad (3)$$

$$Q=\{(s_q^j, a_q^j, y_q^j) | q \in [1,Q]; j \in [0;N]\}$$

$$T=(S,Q); \; \mathcal{Y}=\{y^j | j \in [0;N]\}$$

where a data point $(s_i^j, a_i^j, y^j)$ denotes a sentence $s_i^j$ with trigger candidate $a_i^j$ and event type $y^j$. $y^0$=NULL is added to represent non-eventive type.

The task T is sampled from three sets of data $\mathcal{D}^{train}$, $\mathcal{D}^{dev}$, and $\mathcal{D}^{test}$ during training, development, and testing whose sets of classes are $\mathcal{Y}^{train}$, $\mathcal{Y}^{dev}$, and $\mathcal{Y}^{test}$, respectively. The sets of classes are mutually disjoint to ensure that the model observes no more than K examples from an unseen class.

At operation 610, the system selects a first support set of labeled samples for a first training task of a current training iteration. In some cases, the operations of this step refer to, or may be performed by, a sample selection component as described with reference to FIG. 2. In some examples, the first training task is $T_1$. The first support set is $S_1$.

At operation 615, the system selects a second support set of labeled samples for a second training task of the current training iteration, where the second support set is selected from a set of stored samples from at least one previous training iteration, and where the second support set includes a same set of ground-truth labels as the first support set. In some cases, the operations of this step refer to, or may be performed by, a sample selection component as described with reference to FIG. 2. In some examples, the second training task is $T_2$. The second support set is $S_2$. Storing labeled samples from a previous support set and selecting a second support will be described greater detail in FIG. 8.

At operation 620, the system classifies the labeled samples of the first support set and the second support set using a few-shot classification network to obtain predicted labels for the first support set and the second support set. In some cases, the operations of this step refer to, or may be performed by, a few-shot classification network as described with reference to FIG. 2.

Some examples of the method, apparatus, and non-transitory computer readable medium further include training a first prototypical classifier based on the first support set. Some examples further include classifying the labeled samples of the first support set and the second support set using the first prototypical classifier to obtain first predicted labels for the first support set and the second support set. Some examples further include training a second prototypical classifier based on the second support set. Some examples further include classifying the labeled samples of the first support set and the second support set using the second prototypical classifier to obtain second predicted labels for the first support set and the second support set. Some examples further include computing a first divergence based on the first predicted labels of the first support set and the second predicted labels of the first support set. Some examples further include computing a second divergence based on the first predicted labels of the second support set and the second predicted labels of the second support set, wherein the loss function is based on the first divergence and the second divergence.

According to an embodiment, cross-task consistency (CTC) further reduces the sample bias by introducing prediction consistency between classifiers generated from two tasks. In some cases, one of the classifiers is assumed to be impaired by the poor sampling. In some examples, a knowledge distillation technique is used to transfer knowledge from a stronger classifier to a weaker classifier resulting in a machine learning model that is robust to sample bias. The cross-task consistency is implemented to minimize the differences between predicted label distributions from the classifiers of two tasks as follows:

$$L_2 = KL(f_{S_1}(Q_1), f_{S_2}(Q_1)) + KL(f_{S_1}(Q_2), f_{S_2}(Q_2)) \quad (4)$$

where $f_S$ is a prototypical classifier trained from a support set $S$ and KL denotes the Kullback—Leibler divergence. In some examples, the first prototypical classifier is $f_{S_1}$. The second prototypical classifier is $f_{S_2}$.

At operation 625, the system computes a loss function for the current training iteration based on the first support set and the second support set by comparing the predicted labels and the ground-truth labels. In some cases, the operations of this step refer to, or may be performed by, a training component as described with reference to FIG. 2. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

Some examples of the method, apparatus, and non-transitory computer readable medium further include computing a first cross-entropy loss based on the predicted labels of the first support set. Some examples further include computing a second cross-entropy loss based on the predicted labels of the second support set, wherein the loss function is computed based on the first cross-entropy loss and second cross-entropy loss.

According to an embodiment, the first cross-entropy loss is $L_1(S_1, Q_1)$. The second cross-entropy loss is $L_1(S_2, Q_2)$. The total loss ($\alpha$ is a hyper-parameter) is minimized to train machine learning model 225 (see FIG. 2):

$$L = L_1(S_1, Q_1) + L_1(S_2, Q_2) + \alpha L_2 \quad (5)$$

At operation 630, the system updates parameters of the few-shot classification network based on the loss function. In some cases, the operations of this step refer to, or may be performed by, a training component as described with reference to FIG. 2.

Figure 7:
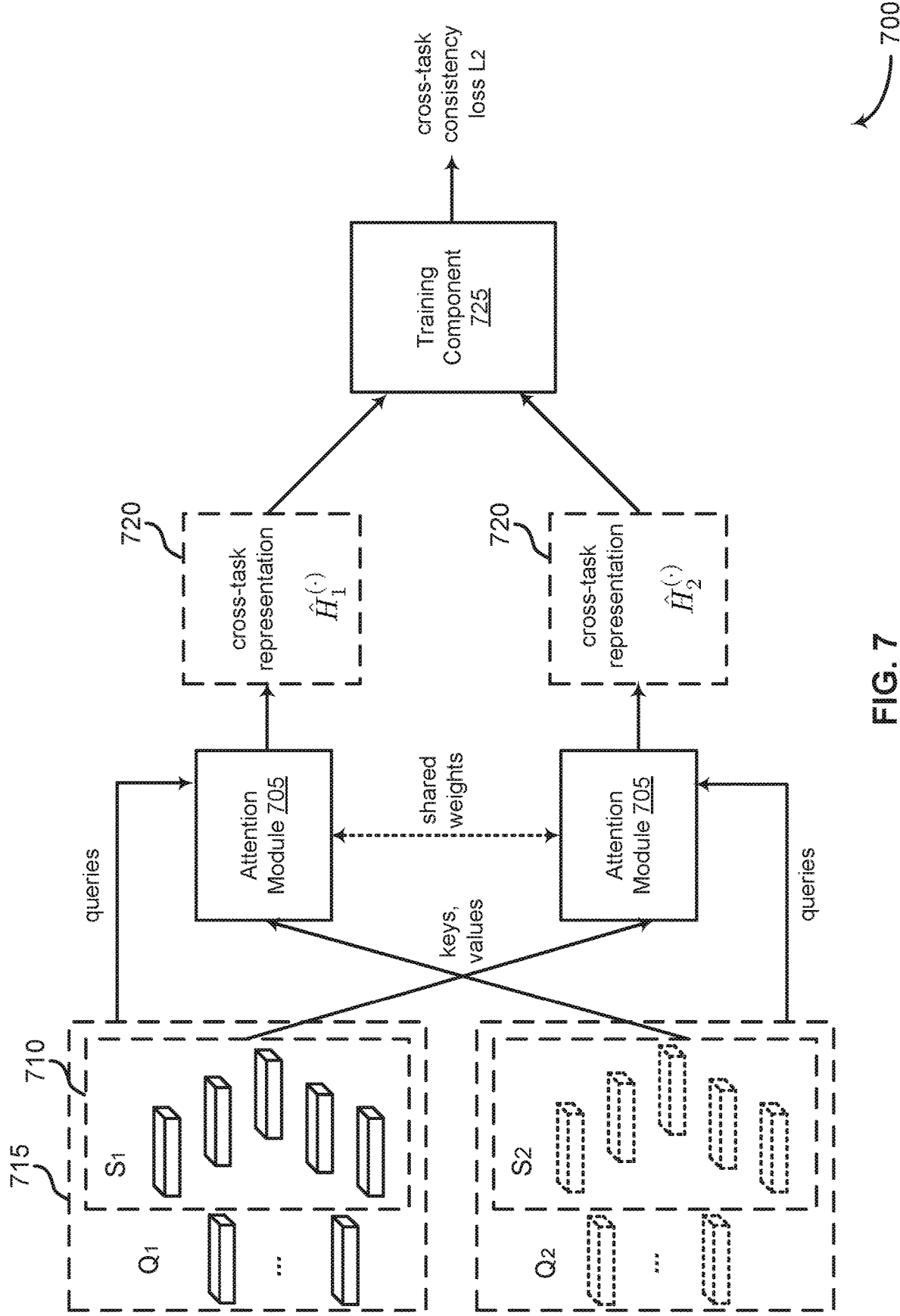
FIG. 7 shows an example of a training procedure according to aspects of the present disclosure.

FIG. 7 shows an example of a training procedure according to aspects of the present disclosure. Training component 220 as shown in FIG. 2 is configured to train machine learning model 700. The example shown includes machine learning model 700, attention module 705, feature matrices of support samples 710, feature matrix of all samples 715, cross-task representation 720, and training component 725. Machine learning model 700 is an example of, or includes aspects of, the corresponding element described with reference to FIG. 2. Machine learning model 700 includes components for modeling episode-level relationships. FIG. 7 illustrates 5-way 1-shot setting. Note each solid-line and dash-line cuboid denotes a single instance.

In some examples, machine learning model 700 explicitly models the relationships across episodes. Machine learning model 700 is configured to model episode-level relationships, two-way episodes are sampled in each training iteration from the same set of base classes.

Referring to FIG. 7, two N-Way K-shot Q-query episodes are sampled. $S_1$ and $S_2$ denote the feature matrices of support samples in a first episode and a second episode, respectively. $Q_1$ and $Q_2$ denote the feature matrices of query samples in the first episode and the second episode, respectively. In some examples, for the first episode, let $F^{(1)} = [S_1, Q_1]$ be the feature matrix of all samples in the first episode. Attention module 705 takes the triplet $(F^{(1)}, S_2, S_2)$ as input. The triplet corresponds to the input (queries, keys, values) in an attention module. The inputs are first linearly mapped into a latent space with the same dimension of the feature space (using projection matrices $W_Q$, $W_K$, and $W_V$.

Similarly, for the second episode, let $F^{(2)} = [S_2, Q_2]$ be the feature matrix of all samples in the second episode. Attention module 705 takes the triplet $(F^{(2)}, S_1, S_1)$ as input. The triplet corresponds to the input (queries, keys, values) in an attention module. The learnable parameters of fully connected layers (i.e., $W_Q$, $W_K$, and $W_V$) are shared. Attention module 705 then generates cross-task representation $\hat{H}_1^{(\cdot)}$ and $\hat{H}_2^{(\cdot)}$, respectively. Attention module 705 is an example of, or includes aspects of, the corresponding element described with reference to FIGS. 2 and 3. Detail with regards to generating cross-task representation will be described below in FIG. 9. Cross-task representation $\hat{H}_1^{(\cdot)}$ and $\hat{H}_2^{(\cdot)}$ are input to training component 725 to compute cross-task consistency loss $L_2$. The cross-task consistency is implemented to minimize the differences between predicted label distributions from the classifiers of two tasks. Detail with regards to cross-task consistency loss is described in FIG. 6.

In some examples, machine learning model may apply cross-episode consistency regularization that utilizes instance-level attention to alleviate the negative effects of the poor support set instance sampling so that each query set instance can be assigned to the right class with minimal loss. Cross-episode consistency regularization may further reduce the model sensitivity to poorly-sampled shots in different episodes by forcing the two classifiers learned over the two episodes to produce consistent predictions.

Figure 8:
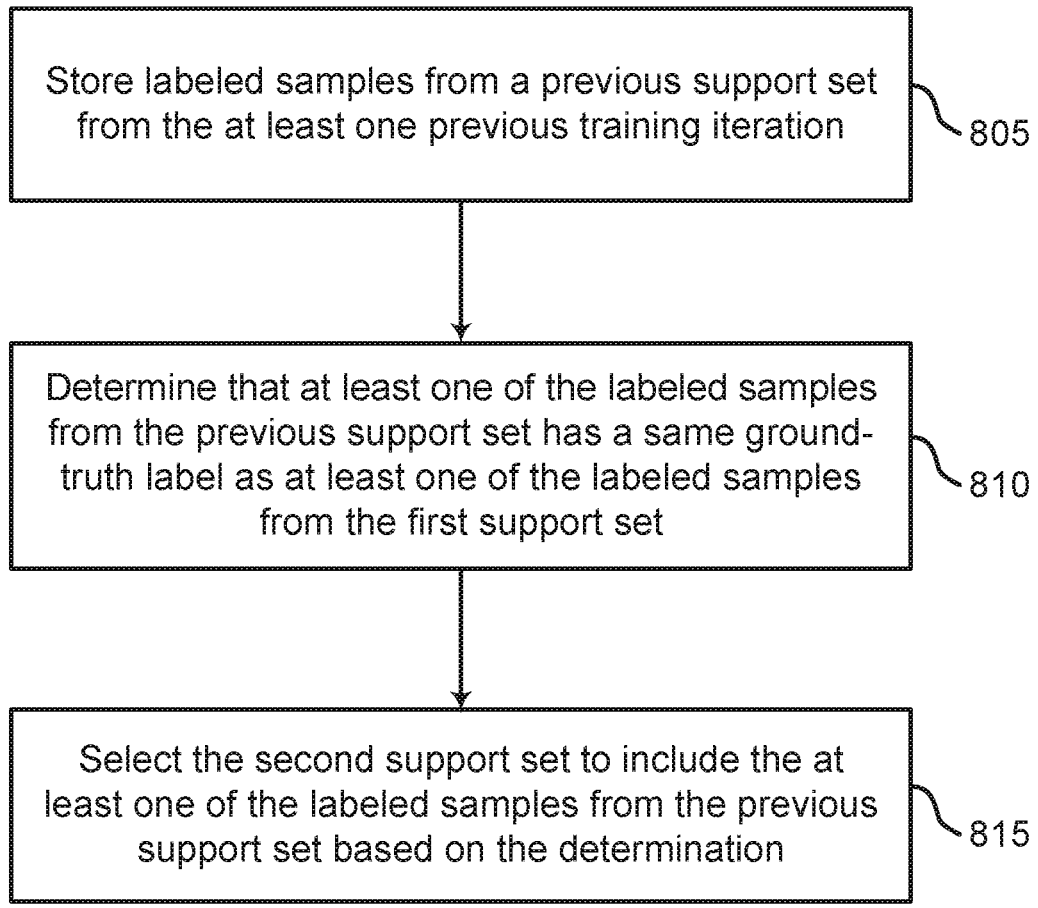
FIG. 8 shows an example of a method for selecting a support set according to aspects of the present disclosure.

FIG. 8 shows an example of a method for selecting a support set according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system stores labeled samples from a previous support set from the at least one previous training iteration. In some cases, the operations of this step refer to, or may be performed by, a sample selection component as described with reference to FIG. 2. The machine learning model is configured for cross-task data augmentation.

At operation 810, the system determines that at least one of the labeled samples from the previous support set has a same ground-truth label as at least one of the labeled samples from the first support set. In some cases, the operations of this step refer to, or may be performed by, a sample selection component as described with reference to FIG. 2.

At operation 815, the system selects the second support set to include the at least one of the labeled samples from the previous support set based on the determination. In some cases, the operations of this step refer to, or may be performed by, a sample selection component as described with reference to FIG. 2. In some examples, in conventional episode training, two consecutive training tasks $T_1$ and $T_2$ may not share identical event type sets, $\mathcal{Y}_1 \neq \mathcal{Y}_2$. According to some embodiments, the training process, via the training component, has memory to save the latest samples of every event type used in prior tasks. Using this memory, after a certain number of training iterations, for a new task $T_1$, a second sample $T_2$ can be sampled from the memory such that Y2=Y1. In some examples, the expected value of delaying iterations for 5-way on ACE dataset is 13 iterations (stdev=4). The expected value of delaying iterations for RAM dataset is 98 iterations (stdev=24) based on 1 M simulations.

TABLE 1

A sample recycling procedure.

| | sampling a subset of event types and sampling a subset of data points | sample recycling and store samples from previous iteration in memory |
|---|---|---|
| Episode 1 | A1 B1 C1 D1 E1 | |
| Episode 2 | A2 B2 C2 E2 F2 | |
| Episode 3 | C3 D3 E3 G3 H3 | |
| Episode 4 | A4 B4 E4 D4 H4 | A2 B2 E3 D1 H3 (most recent subset of the class A, B, E, D, H) |
| ... | | |
| Episode n-1 | | |
| Episode n | | |

As an example illustrated in Table 1 above, it shows 5-way 5-shot as there are five event types (5-way) and five examples per event type in the support set. A task is a combination of support set (N×K examples) and query set (N×Q examples). In each training iteration, training component 220 samples a subset of event types (e.g., A, B, C, D, E). From each sampled event type (e.g., event type A), training component 220 samples a subset of data points (e.g., A1). At training iteration 4 (i.e., episode 4), training component 220 samples A4, B4, E4, D4, and H4. In addition, training component can access and retrieve A2, B2, E3, D1, and H3 (i.e., the most recent subset of the class A, B, E, D, and H). According to some embodiments, training component 220 is configured to have memory to save the latest samples of every event type used in prior tasks.

Figure 9:
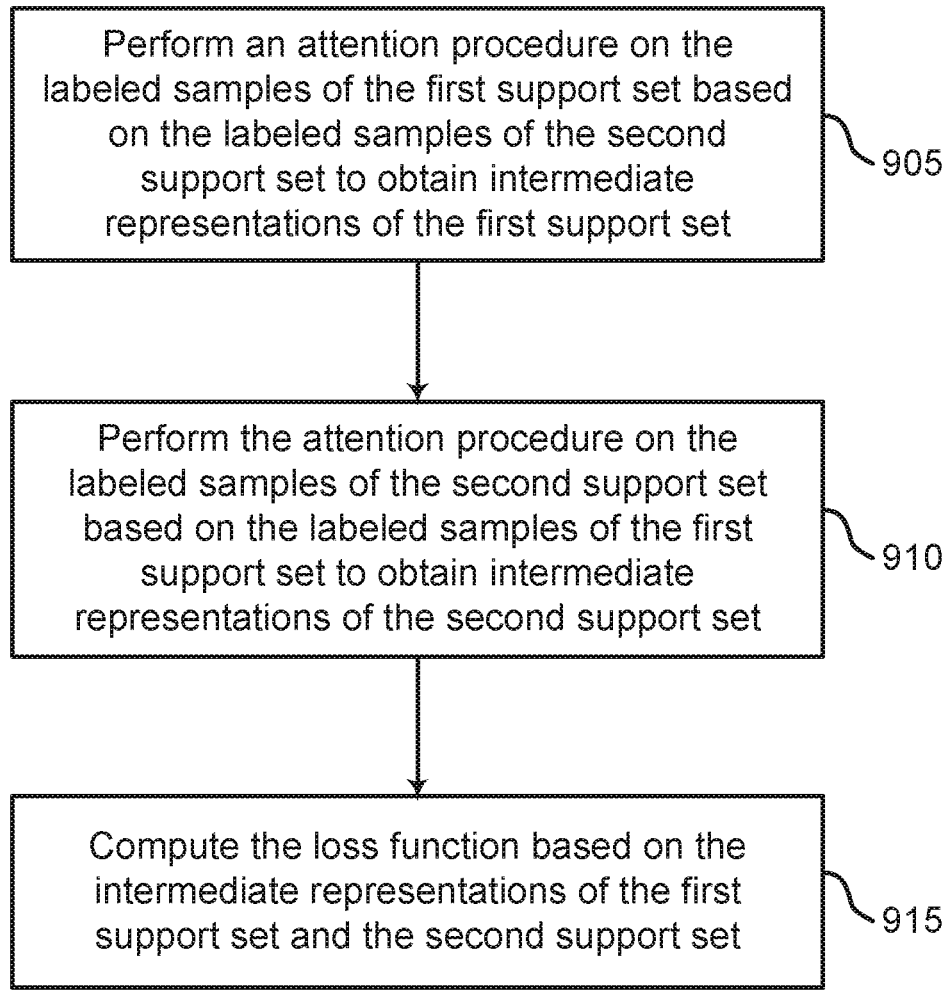
FIG. 9 shows an example of an attention procedure according to aspects of the present disclosure.

FIG. 9 shows an example of an attention procedure according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system performs an attention procedure on the labeled samples of the first support set based on the labeled samples of the second support set to obtain intermediate representations of the first support set. In some cases, the operations of this step refer to, or may be performed by, an attention module as described with reference to FIGS. 2 and 3. In some examples, the first support set is denoted as $S_1$ and second support set is denoted as $S_2$. A first training task is denoted as $T_1$ and a second training task is denoted as $T_2$.

The machine learning model is configured for prototype across task. Two tasks $T_1=(S_1, Q_1)$ and $T_2=(S_2, Q_2)$ are sampled with the same set of event type $\mathcal{Y}$. The prototypes are induced from both tasks as follows. Let $E_1^S, E_2^S, E_1^Q, E_2^Q$ be the representation vectors of $S_1, S_2, Q_1, Q_2$, respectively, where $E_1^S, E_2^S \in R^{(N+1)K \times u}$ and $E_1^Q, E_2^Q \in R^{(N+1)Q \times u}$ (returned by $\phi$). Then, an attention module, denoted by att, induces intermediate representations for the support and query instances of $T_1$ via weighted sums of the support vectors of $T_2$, and vice versa:

$$\hat{H}_1^{(\cdot)} = att(E_1^{(\cdot)}, E_2^S) = \frac{1}{\sqrt{\mu}} sm(E_1^{(\cdot)}, (E_2^S)^T) E_2^S \qquad (6)$$

-continued $$\hat{H}_2^{(\cdot)} = att(E_2^{(\cdot)}, E_1^S) = \frac{1}{\sqrt{\mu}} sm(E_2^{(\cdot)}, (E_1^S)^T) E_1^S$$

The final representations for both tasks are the sum of the corresponding original representations and the cross-task representations: $H^{(\cdot)} = E^{(\cdot)} + \hat{H}^{(\cdot)}$. Next, the prototypes for tasks $T_1$ and $T_2$ are computed by averaging vectors of the same class from $H_1^S$ and $H_2^S$, respectively.

At operation 910, the system performs the attention procedure on the labeled samples of the second support set based on the labeled samples of the first support set to obtain intermediate representations of the second support set. In some cases, the operations of this step refer to, or may be performed by, an attention module as described with reference to FIGS. 2 and 3.

At operation 915, the system computes the loss function based on the intermediate representations of the first support set and the second support set. In some cases, the operations of this step refer to, or may be performed by, a training component as described with reference to FIG. 2.

Performance of apparatus, systems and methods of the present disclosure have been evaluated, and results indicate embodiments of the present disclosure have obtained increased performance over existing technology. Example experiments demonstrate that event detection apparatus 200 outperforms conventional systems.

In some examples, machine learning model 225 has no access to the prior task of the unseen class. Thus, the prototypes are computed exclusively based on the vectors of the current task. Hence, machine learning model 225 turns into the original prototypical network. The methods of the present disclosure apply to training and can outperform conventional FSL event detection systems.

The machine learning model is evaluated on three event detection datasets. RAMS is a large-scale dataset and provides 9124 human-annotated event triggers for 139 event subtypes. ACE is a benchmark dataset in event extraction with 33 event subtypes. LR-KBP is a large-scale event detection dataset for FSL. It merges ACE-2005 and TAC-KBP datasets and extends some event types by automatically collecting data from Freebase and Wikipedia. Since RAMS and ACE datasets are designed for supervised learning, some examples re-split them for FSL training. For RAMS, some examples merge the original training/development and testing splits. Some examples discard 5 event subtypes whose number of samples are not sufficient for sampling. Event types (Artifact-Existence, Conflict, Contact, Disaster, Government, Inspection, Manufacture, Movement) are used for training, (Justice, Life) for development, and (Personnel, Transaction) for testing. For the LR-KBP dataset, some examples follow the same 5-fold cross-validation procedure, then report the average performance. The numbers of event subtypes for the development and testing sets are set to 10.

Some examples evaluate the machine learning model on 5+1-way 5-shot and 10+1-way 10-shot FSL settings. Because training with more classes increases the model performance, 18+1 classes are used during training while keeping 5+1 and 10+1 novel classes during testing.

Some example experiments consider three strong baselines for FSL event detection. Proto features a prototype for each novel class and Euclidean distance function. InterIntra is an extension of the prototypical network with two auxiliary training signals. It minimizes the distances among data points of the same class and maximizes the distances among prototypes. DMB-Proto extends the prototypical network in a way that the representation vector for each data point is induced by a dynamic memory network running on the data of the same class. In some examples, the few-shot classification network includes a dynamic memory module. In some examples, the machine learning model includes BERT-based sentence encoders $\phi$ for event detection, e.g., BERTMLP and BERTGCN.

Regarding hyperparameters, stochastic gradient decent optimizer is used with learning rate $1e^{31}$ $^{-4}$. The training/evaluation is set to 6,000 and 500 iterations respectively. The evaluation is done after every 500 training iterations. The dimension of the final representation is set to 512. In some examples, dropout rate is set to 0.5 to prevent overfitting. The coefficient of the cross-task consistency loss is set to $\alpha=10$ based on the best development performance ($\alpha \in \{1,10,100,1000\}$). Event detection apparatus 200 is evaluated using the micro F1-score.

Regarding ablation study, machine learning model 225 involves three factors. They are cross-task data (data), cross-task attentive prototype (attention) and cross-task consistency (consistency). To analyze efficiency of these modules, some example experiments incrementally eliminate these modules from the full ProAcT model and evaluate the remaining model on 5+1-way 5-shot setting. If attention and loss are removed while data remains, machine learning model 225 becomes a prototypical network with 5+1-way 10-shot setting during training. This modified model has the same amount of support data that machine learning model 225 has at training. Note the testing with unseen classes remains 5+1-way 5-shot setting. If the cross-task data is eliminated, the attentive prototype and consistency loss are also removed, machine learning model 225 returns to a prototypical network with 5+1-way 5-shot setting.

In some example experiments, removing any module leads to a decrease between [0.8%-1.3%] in performance. When attention and consistency are eliminated, the performance drops by 2.3%. A further drop of 2.4% would occur if the cross-task data is eliminated. Accordingly, the cross-task data, the attention for prototype computation and the consistency of cross-task predictions contribute to increased performance of event detection apparatus 200.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training a machine learning model, comprising:
   receiving a training set comprising a plurality of labeled samples, wherein each of the plurality of labeled samples is associated with a ground-truth label from a plurality of ground- truth labels;
   randomly selecting a first support set from the plurality of labeled samples for a first training task of a current training iteration;
   selecting a second support set from the plurality of labeled samples for a second training task of the current training iteration based on the first support set by identifying a corresponding label for each labeled sample of the first support set and selecting a stored labeled sample having the corresponding label from a previous training iteration;
   classifying labeled samples of the first support set and the second support set using a few-shot classification network to obtain predicted labels for the first support set and the second support set;
   computing a loss function for the current training iteration by comparing the predicted labels and the ground-truth labels, wherein the loss function includes a first term based on the first support set and a second term based on the second support set; and
   updating parameters of the few-shot classification network based on the loss function.

2. The method of claim 1, further comprising:
   selecting a first query set of unlabeled samples for the first training task; and
   selecting a second query set of unlabeled samples for the second training task, wherein the loss function is computed based on the first query set and the second query set.

3. The method of claim 1, further comprising:
   storing labeled samples from a previous support set from the previous training iteration; and
   determining that at least one of the labeled samples from the previous support set has a same ground-truth label as at least one of the labeled samples from the first support set, wherein the second support set is selected to include the at least one of the labeled samples from the previous support set based on the determination.

4. The method of claim 3, further comprising:
   replacing the at least one of the labeled samples from the previous support set with the at least one of the labeled samples from the first support set in a memory based on the determination.

5. The method of claim 1, further comprising:
   encoding the labeled samples of the first support set and the second support set using an encoder of the few-shot classification network to obtain encoded samples of the first support set and the second support set, wherein the predicted labels of the first support set and the second support set are obtained based on the encoded samples of the first support set and the second support set.

6. The method of claim 1, further comprising:
   performing an attention procedure on the labeled samples of the first support set based on the labeled samples of the second support set to obtain intermediate representations of the first support set; and
   performing the attention procedure on the labeled samples of the second support set based on the labeled samples of the first support set to obtain intermediate representations of the second support set, wherein the loss function is computed based on the intermediate representations of the first support set and the second support set.

7. The method of claim 6, further comprising:
   performing the attention procedure on unlabeled samples of a first query set of the first training task based on the labeled samples of the second support set to obtain intermediate representations of the first query set; and
   performing the attention procedure on unlabeled samples of a second query set of the second training task based on the labeled samples of the first support set to obtain intermediate representations of the second query set, wherein the loss function is computed based on the intermediate representations of the first query set and the second query set.

8. The method of claim 6, further comprising:
   averaging the intermediate representations of the first support set to obtain a first prototype of the first support set; and
   averaging the intermediate representations of the second support set to obtain a second prototype of the second support set, wherein the loss function is computed based on the first prototype and the second prototype.

9. The method of claim 1, further comprising:
   computing a first cross-entropy loss based on the predicted labels of the first support set; and
   computing a second cross-entropy loss based on the predicted labels of the second support set, wherein the loss function is computed based on the first cross-entropy loss and the second cross-entropy loss.

10. The method of claim 1, further comprising:
    training a first prototypical classifier based on the first support set;
    classifying the labeled samples of the first support set and the second support set using the first prototypical classifier to obtain first predicted labels for the first support set and the second support set;
    training a second prototypical classifier based on the second support set;
    classifying the labeled samples of the first support set and the second support set using the second prototypical classifier to obtain second predicted labels for the first support set and the second support set;
    computing a first divergence based on the first predicted labels of the first support set and the second predicted labels of the first support set; and
    computing a second divergence based on the first predicted labels of the second support set and the second predicted labels of the second support set, wherein the loss function is based on the first divergence and the second divergence.

11. The method of claim 1, further comprising:
    identifying a number of initial training iterations; and
    determining that an index of the current training iteration is greater than the number of initial training iterations, wherein the second training task is selected based on the determination that the index of the current training iteration is greater than the number of initial training iterations.

12. The method of claim 11, further comprising:
    determining that an index of the previous training iteration is less than the number of initial training iterations; and
    computing the loss function for the previous training iteration using a single training task based on the determination that the index of the previous training iteration is less than the number of initial training iterations.

13. A method for event detection, comprising:
receiving text including an event trigger word indicating an occurrence of an event;
classifying the event trigger word to obtain an event type using a few-shot classification network, wherein the few-shot classification network is trained by operations comprising:
  randomly selecting a first support set from a plurality of labeled samples for a first training task of a current training iteration:
  selecting a second support set from the plurality of labeled samples for a second training task of the current training iteration based on the first support set through identifying a corresponding label for each labeled sample of the first support set and selecting a stored labeled sample having the corresponding label from a previous training iteration,
  obtaining predicted labels for the first support set and the second support set and corresponding ground-truth labels;
  computing a loss function for the current training iteration by comparing the predicted labels and the corresponding ground-truth labels, wherein the loss function includes a first term based on the first support set and a second term based on the second support set; and
  updating parameters of the few-shot classification network based on the loss function, and
transmitting event detection information including the event trigger word and the event type.

14. The method of claim 13, further comprising:
receiving a document including the text; and
generating the event detection information by classifying each event trigger word in the document.

15. The method of claim 13, further comprising:
receiving a query from a user;
generating a response to the query based on the event detection information; and
providing the response to the user.

16. An apparatus for event detection, comprising:
at least one processor; and
at least one memory including instructions executable by the at least one processor to:
  randomly select a first support set from a plurality of labeled samples for a first training task of a current training iteration, and to select a second support set from the plurality of labeled samples for a second training task of the current training iteration based on the first support set by identifying a corresponding label for each labeled sample of the first support set and selecting a stored labeled sample having the corresponding label from a previous training iteration;
  classify, using a few-shot classification network, labeled samples of the first support set and the second support set to obtain predicted labels for the first support set and the second support set; and
  compute a loss function for the current training iteration by comparing the predicted labels and ground-truth labels, wherein the loss function includes a first term based on the first support set and a second term based on the second support set, and to update parameters of the few-shot classification network based on the loss function.

17. The apparatus of claim 16, further comprising instructions executable by the at least one processor to:
  encode the labeled samples of the first support set and the second support set to obtain encoded samples of the first support set and the second support set, wherein the predicted labels of the first support set and the second support set are obtained based on the encoded samples of the first support set and the second support set.

18. The apparatus of claim 17, further comprising instructions executable by the at least one processor to:
  classify the labeled samples of the first support set and the second support set based on the encoded samples of the first support set and the second support set.

19. The apparatus of claim 16, further comprising instructions executable by the at least one processor to:
  perform an attention procedure on the labeled samples of the first support set based on labeled samples of the second support set to obtain intermediate representations of the first support set, and to perform the attention procedure on the labeled samples of the second support set based on the labeled samples of the first support set to obtain intermediate representations of the second support set, wherein the loss function is computed based on the intermediate representations of the first support set and the second support set.

20. The apparatus of claim 16, further comprising instructions executable by the at least one processor to:
  store labeled samples from a previous support set from at least one previous training iteration, and to determine that at least one of the labeled samples from the previous support set has a same ground-truth label as at least one of the labeled samples from the first support set, wherein the second support set is selected to include the at least one of the labeled samples from the previous support set based on the determination.

* * * * *